Oct. 13, 1970  W. E. GLENN, JR  3,534,164
METHOD AND APPARATUS FOR PRODUCING 3D PICTURES UTILIZING
A SCANNING ELECTRON BEAM
Filed April 18, 1967  3 Sheets-Sheet 1
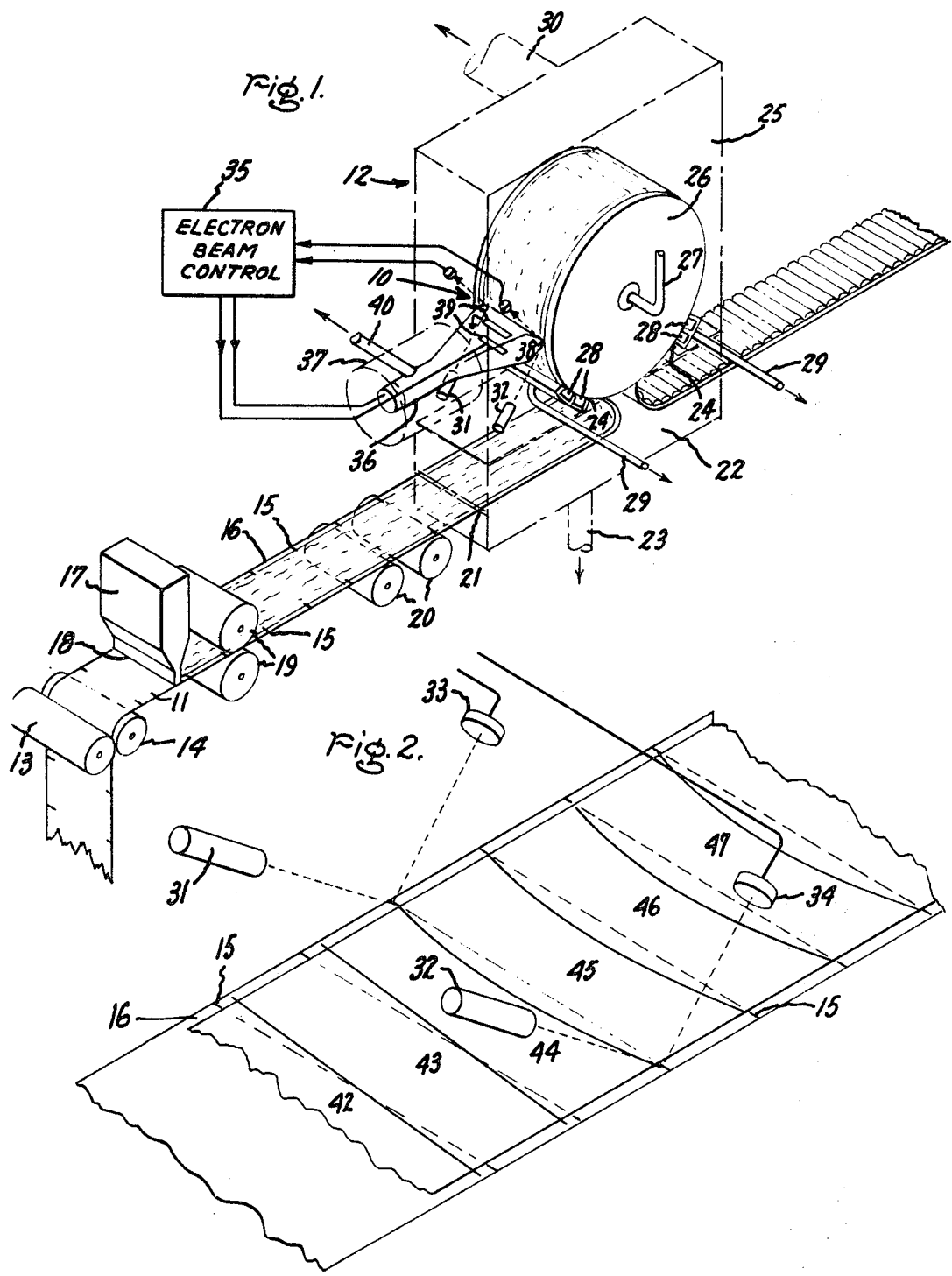
Inventor:
William E. Glenn Jr,
by John J. Kinsen
His Attorney.

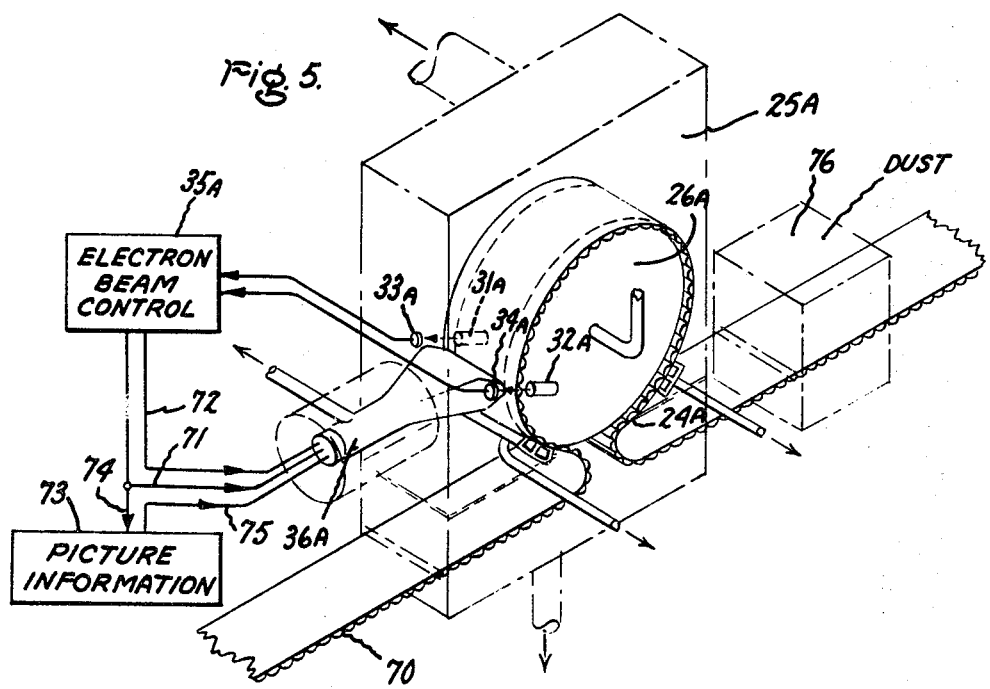

United States Patent Office 3,534,164
Patented Oct. 13, 1970

3,534,164
METHOD AND APPARATUS FOR PRODUCING 3D PICTURES UTILIZING A SCANNING ELECTRON BEAM
William E. Glenn, Jr., Scotia, N.Y., assignor to General Electric Company, a corporation of New York
Continuation-in-part of application Ser. No. 495,276, Oct. 12, 1965. This application Apr. 18, 1967, Ser. No. 631,771
Int. Cl. H04n 9/54, 5/82
U.S. Cl. 178—6.6      12 Claims

ABSTRACT OF THE DISCLOSURE

Registration of groups of interdigitated picture elements with an overlying lenticular screen is accomplished by printing position markers at the ends of selected groups of interdigitated picture elements simultaneously with the printing of the picture elements and coating the printed picture elements with a smooth layer of deformable thermoplastic. The thermoplastic coated picture elements are forwarded over heated rollers to a vacuum chamber having a differentially pumped sectioned aperture to permit continuous operation of the process and two photocells sense the location of the position markers to control the sweep of an electron beam selectively charging the surface of the thermoplastic. The initiation of the beam sweep is controlled by the detection of a position marker along one edge of the printed picture element while a vertical parabolic signal of fixed intensity and a signal proportional to the phase variation between the outputs of the photocells sensing the position markers on opposite sides of the same groups of interdigitated picture elements are summed to control the deflection of the beam. The charged thermoplastic is retained under vacuum for the time interval required for the electrostatic charge to deform the smooth thermoplastic coating into a lenticular sheet in registry with the groups of picture elements. Alternately the position of lenticules in a pressed lenticular sheet is detected utilizing two photocells situated along the edges of the pressed sheet and the outputs of the photocells is employed to control initiation of electron beam writing of picture information on the flat surface of the pressed sheet. The charged thermoplastic then is dusted with a toner which subsequently is fused to produce groups of picture elements in registry with the pressed lenticular sheet.

---

Figure 3:
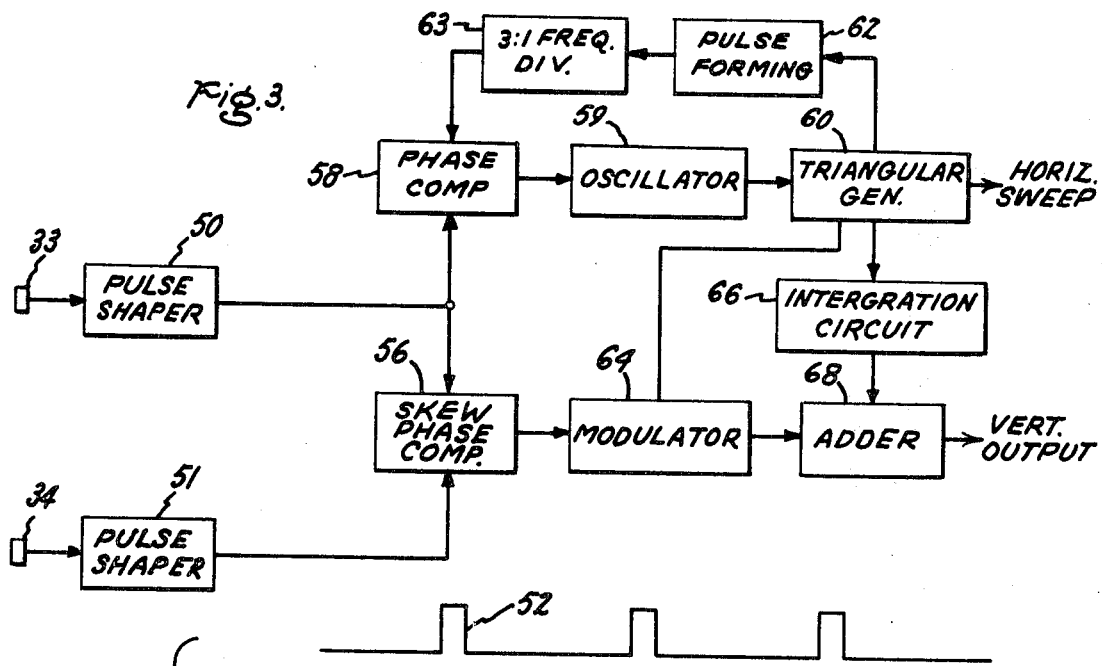

This application is a continuation-in-part of application Ser. No. 495,276, filed Oct. 12, 1965, and assigned to the assignee of the present invention.

This invention relates to a method and apparatus for producing high quality three dimensional pictures and in particular to a method and apparatus for registering a thermoplastic lenticular screen and underlying groups of interdigitated picture elements by controlling the scan of an electron beam across a thermoplastic surface in accordance with the position of a completed segment of the three dimensional picture.

The production of high quality still photographs exhibiting a three dimensional effect without the aid of a viewing instrument has been the quest of photographers for many years in striving for greater realism. Recently, there has been considerably activity and interest in producing three dimensional pictures in quantity as in magazines of large circulation. In such pictures, a plurality of vertically extending cylindrical lenses are situated in an overlying position relative to a plurality of groups of interdigitated picture elements and a panoramic view of the scene is obtained as the viewer scans the photograph in a horizontal direction. The qaulity of such three dimensional pictures is highly dependent upon the registry of the groups of interdigitated picture elements and the overlying lenses.

While it has been imperative for high quality photographs that the registration of groups of interdigitated picture elements with the overlying lenticules not vary, such a result often is difficult to obtain because of uncontrollable paper shrinkage or stretch caused by wet printing of the picture elements. The resulting distortion of the picture elements produces a skew between the groups of picture elements and the straight overlying lenticules resulting in an inferior photograph.

The alignment problem in three dimensional photographs is further augmented by the fact that some printing processes inherently produce line curvature in the interdigitated picture elements. Therefore while the extremities of a group of interdigitated picture elements and the overlying lenticule may be in alignment, the curvature at the center of the group of picture elements in releation to the straight overlying lens produces a distorted photograph.

Attempts to overcome the alignment problem by automatically gluing groups of interdigitated picture elements upon the flat surface of an extruded lenticular sheet has not proved successful because skew between the lenticular sheet and the underlying groups of interdigitated picture elements produced three dimensional pictures of inferior quality. Even hand registration utilizing powerful magnifying lenses has been utilized in prior attempts to properly register the groups of picture elements with an overlying lenticular sheet because high quality mechanical registration between the cylindrical lenses and the underlying groups of interdigitated picture elements previously has not been obtainable.

It is therefore an object of this invention to provide a method of producing high quality three dimensional pictures by controlling the traversal of an electron beam across a thermoplastic sheet.

It is also an object of this invention to provide a method of producing high quality three dimensional pictures by controlling the traversal of an electron beam in accordance with the position of groups of interdigitated picture elements.

It is a further object of this invention to provide a method of producing improved registration between a lenticular sheet and underlying groups of interdigitated picture elements by the utilization of position markers in a predetermined relationship with selected interdigitated picture elements.

It is another object of this invention to provide improved registration between a pressed lenticular sheet and underlying groups of interdigitated picture elements by utilizing lenticules of the pressed sheet to control the printing of the interdigitated picture elements.

It is a further object of this invention to provide a method of improving the registration between a lenticular sheet and underlying groups of interdigitated picture elements by deflecting a scanning electron beam with a parabolic signal to compensate for line curvature.

It is also an object of this invention to provide an apparatus for producing high quality three dimensional pictures by the traversal of an electron beam across a thermoplastic sheet.

The method of this invention for producing three dimensional pictures of the type having a thermoplastic lenticular screen overlying and registered with groups of interdigitated picture elements by the traversal of an electron beam generally comprises scanning an electron beam across a thermoplastic sheet to establish spaced lines of charge on the thermoplastic surface and controlling the electron beam in accordance with the position of a completed component portion of the three dimensional picture to register the lines of charge with the side edges of the completed component portion of the three dimensional picture. Either groups of interdigitated picture elements or a pressed lenticular sheet can serve as the completed component portion of the three dimensional picture dependent upon the order of formation of the picture. Preferably means are provided both for synchronizing the initiation of the traversal of the electron beam with the advent of a preselected section of the completed component portion of the three dimensional picture under the electron beam and for deflecting the electron beam during traversal by an amount proportional to the measured skew of the complete component portion.

Thus in one aspect of this invention position indicators are printed at the ends of selected picture elements simultaneously with the printing of the element and the print is covered with a smooth thermoplastic coating. Any skew produced in a picture element during the printing or coating processes is reflected in the relative location of the position indicators at the opposite ends of the picture element. The locations of the position indicators subsequently are detected and converted to a waveform having a magnitude proportional to the degree of skew of the picture element. The proportional voltage then is applied to a circuit controlling the traversal path of an electron beam across the thermoplastic coating during the formation of the overlying lenses to deflect the scan by an amount equal to the relative location of the position indicators. Because some printing processes inherently produce line curvature which curvature is not observable by the relative location of the position indicators, a fixed vertical parabolic signal also is applied to the deflection circuitry controlling the positioning of the electron beam traversal of the thermoplastic sheet.

The locations of the position indicators along a single edge of the printed sheet also are utilized to synchronize the initiation of the traversal of the electron beam with the advent under the electron beam of the group of interdigitated picture elements associated with the position indicator. The position indicators along one edge of the printed sheet therefore perform a dual function serving both as a control of the initiation of the electron beam traversal and as a comparison with the position indicators along the opposite edge of the printed sheet to measure the skew of the associated groups of interdigitated picture elements.

In another aspect of this invention, the lenticules are mechanically pressed on a transparent thermoplastic sheet before the printing of the groups of interdigitated picture elements. The skew of the pressed lenticules is measured by impinging a light beam on the lenticular surface of the sheet at opposite ends of each lenticule and detecting the relative position of the foci of the light beams on the flat side of the lenticular sheet. The detected foci then are converted to an electrical potential proportional to the skew of the pressed lenticule under examination and the proportional voltage is employed to deflect an electron beam producing a charge pattern corresponding point by point to the picture information to be printed on the flat side of the lenticular sheet. The detected locations of the foci along a single edge of the lenticular sheet also are utilized to control the initiation of selected traversals of the picture information writing electron beam. After a charge pattern corresponding point by point to the interdigitated picture elements has been written, the charged thermoplastic sheet is dusted with a toner which is subsequently fused to the thermoplastic to produce a printed group of interdigitated picture elements in registry with the lenticule under which the group of picture elements are positioned.

Figure 4:
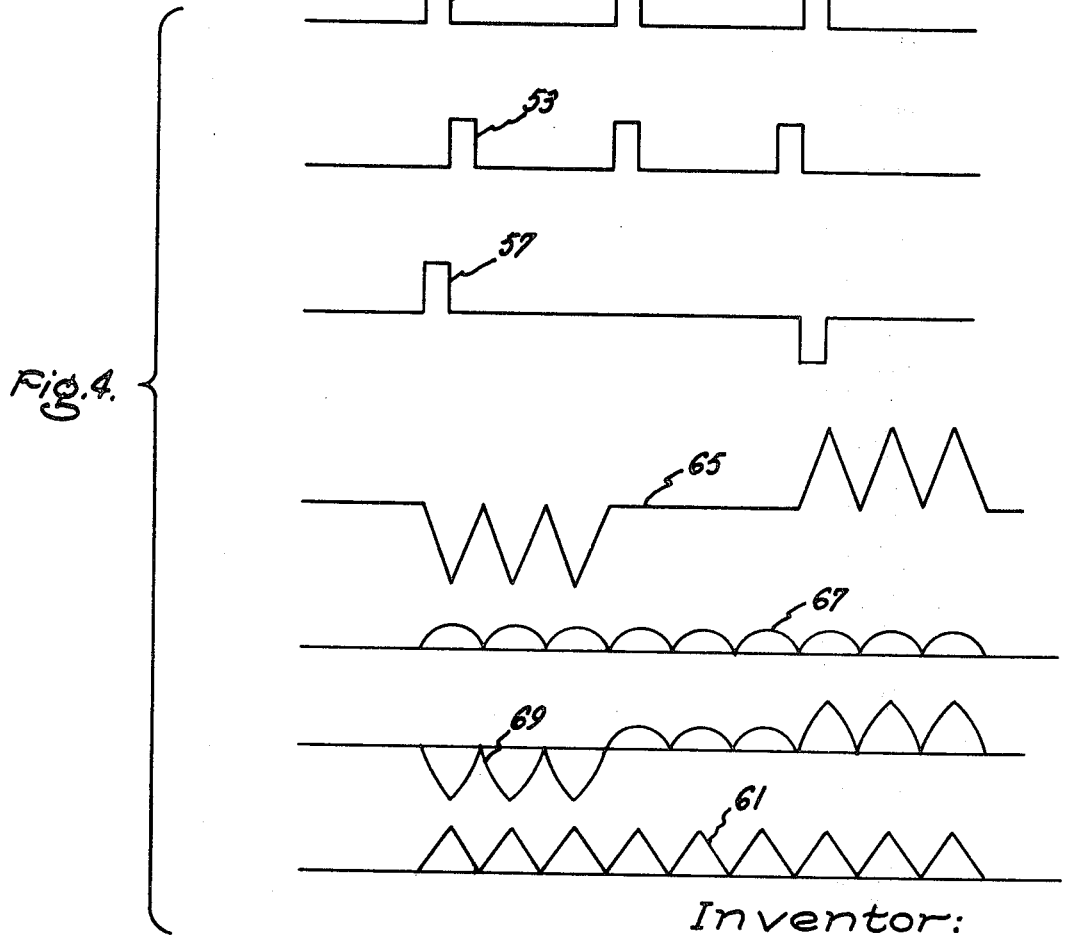

The features of this invention believed to be novel are set forth with particularity in the appended claims. The invention itself, however, both as to organization and method of operation, together with further objects and advantages thereof, may best be understood by refedence to the following description taken in conjunction with the accompanying drawings in which:

FIG. 1 is an isometric view of the printing apparatus used to produce high quality three dimensional photographs in accordance with the method of this invention, FIG. 2 is an enlarged isometric view of the photoelectric detection system utilized in this invention, FIG. 3 is a block diagram of the electron beam control circuit, FIG. 4 portrays the waveforms present at selected locations within the electron beam control circuit, and FIG. 5 depicts an alternate method of this invention wherein the interdigitated picture elements are registered upon a previously pressed lenticular sheet.

Referring more particularly to FIG. 1, a photoelectric detection system 10 is utilized to examine a section of a transported sheet of paper 11 bearing groups of interdigitated picture elements to control the initiation and deflection of a scanning electron beam during the formation of overlying cylindrical lenses within lenticulator 12. Sheet 11 is drawin vertically upward from a supply reel (not shown) and is positioned between rotating printing plate 13 and roller 14 which cooperate to wet print a plurality of groups of interdigitated picture elements upon the face of the paper contacting the printing plate. During this printing step, a plurality of position indicators 15 are printed upon a contrastingly colored border 16 at the end of selected picture elements. Symmetrical portions of selected picture elements such as the straight borders also can serve as position indicators when a sharp color grandient is present.

After the printing has been completed and the paper dried, sheet 11 passes under an extruder 17 having an elongated orifice 18 through which molten transparent thermoplastic is discharged to completely cover the entire width of the sheet. The transparent thermoplastic employed to coat sheet 11 generally is electrostatically deformable in a vacuum and is a medium of the type described and claimed in my U.S. Pat. 3,147,062, issued Nov. 1, 1964, and assigned to the assignee of the present invention. The coated paper is then drawn through a pair of heated rollers 19 having spaced apart confronting faces which smooth the extruded thermoplastic layer to a uniform sheet of desired thickness.

Sheet 11 is transported upon a plurality of hot rollers 20 through slot 21 into a vacuum chamber 22 which is exhausted by conduit 23 centrally situated in the lower face of the chamber to position the sheet for entry within lenticulator 12. By extending the horizontal travel of sheet 11 utilizing reduced pressure upon the underside of the sheet produced by air current flow resulting from the central location of the exhaust aperture for conduit 23 in the lower face of vacuum chamber 22, a relatively narrow opening 24 suffices both as an entrance and as an exit for lenticulator 12. The narrowness of opening 24 inhibits air flow into the lenticulator, the interior of which must be kept under vacuum for proper electrostatic lens formation.

Lenticulator 12 includes a generally closed chamber 25 having a relatively narrow opening 24 in its lower face, a water-cooled roller 26 over which sheet 11 is drawn, and photoelectric scanning system 10. A conduit 27 axially positioned within roller 26 functions to communicate the roller with an external source of flowing coolant (not shown). The lower portion of chamber 25 is provided with a plurality of narrow section 28, each of which are evacuated through exhaust lines 29. By positioning pumped sections 28 adjacent slot 24 through which the thermoplastic coated sheet enters and exits lenticulator 12, the majority of air flow through the slot is exhausted before reaching the main chamber. While only two pumped sections are depicted as serving as air locks adjacent both the input and exit of coated sheet 11 from lenticultor 12 for purposes of clarity, the number of pumped sections employed in actual practice depends upon such factors as the proximity of the mouths of the sections to the coated sheet, the vacuum desired for lenticulator 12 and the capacity of the evacuation pumps (not shown) connected to exhaust lines 29. Air flow into lenticulator 12 along the lower, uncoated surface of sheet 11 is blocked by the seating of the sheet upon the cylindrical surface of roller 26. Thus pumped sections 28 permit thermoplastic coated sheet 11 to feed into and to exit from chamber 25 in a continuous process without destroying the vacuum of the chamber. A vacuum line 30 situated in the upper portion of the rear wall of closed chamber 25 is utilized to exhaust the main chamber of the lenticulator.

The thermoplastic coated sheet passes over roller 26 and is transported by the roller at an attitude relative to photoelectric scanning system 10 to pass the opposite edges of the sheet under the scanning system which functions to detect the relative location of position indicators 15. Photoelectric scanning system 10 generally includes aligned dual light sources 31 and 32 situated above the extremities of sheet 11 and dual detectors 33 and 34 which are positioned respectively at the angles of reflection of the light rays produced by sources 31 and 32. Light from each source impinges upon the thermoplastic coating and traverses the transparent layer to be reflected by the edges of the underlying sheet upon photodetectors 33 and 34. Any shrinkage in sheet 11 produced by the wet printing or any non-uniformity of sheet travel resulting from uneven tension upon the sheet is reflected in a diverse positioning of position indicators 15 along opposite ends of the same picture element as measured by aligned detectors 33 and 34. The outputs of the detectors are fed to an electron beam control circuit 35 which controls the formation of the lenticules.

The electron beam used to place a line of electrostatic charge upon the smooth thermoplastic surface overlying sheet 11 is generated by an electron gun 36 partially situated within a tubular appendage 37 to chamber 25 with the forward portion of the envelope of the gun protruding into the chamber in a confronting attitude with the surface of roller 26. Electron gun 36 is similar in construction to a conventional television picture tube but because of its operation within a vacuum chamber, the front portion of the envelope adjacent roller 26 is provided with a longitudinal slot 38 in alignment with the photoelectrically examined segment of sheet 11 to permit the generated beam from electron gun 36 to impinge upon the thermoplastic surface of the sheet. In order to provide a fine vertical focus of the generated electron beam upon the surface of sheet 11, the vertical deflection and focus plates 39 of the gun are positioned adjacent slot 38 in the forward portion of the envelope confronting sheet 11. One of plates 39 is connected to the vertical output from adder circuit 68 of electron beam control circuit 35, as shown more clearly in FIG. 3, while the other plate is connected to a source of fixed potential, e.g. ground. The electrostatic line of charge produced by the sweep of the electron beam interacts with the hot thermoplastic to produce controllable deformations in the smooth thermoplastic surface in accordance with the disclosure of my previously mentioned U.S. Pat. No. 3,147,062. Because the vacuum within main chamber 25 generally is not sufficient for satisfactory operations of the electron gun, a vacuum line 40 is provided in communication with the envelope of electron gun 36 to reduce the pressure of the gun to an operational value and a tungsten filament is utilized as an electron beam generation source to allow gun operation at higher gas pressures. The accurate positioning of the beam upon the thermoplastic layer of sheet 11 is controlled by the generated signal of photodetectors 33 and 34 as will be more fully explained with reference to FIG. 3.

After the thermoplastic layer has been traversed by the generated electron beam, sheet 11 is carried along by rotating roller 26 past pumped sections 28 to exit lenticulator 12 through opening 24 before being returned to vacuum chamber 22. Sheet 11 is positioned relative to opening 24 by the air pressure gradient formed between the upper coated surface and the lower surface of sheet 11 due to the central location of exhaust conduit 23 in the lower face of vacuum chamber 22. Because it is necessary for the lenticules to form within the vacuum atmosphere of the chamber, the travel speed of sheet 11 should be so chosen that the lenticules will have completely formed in the interval between the electron beam scan and the passage of the lenticulated sheet past pumped sections 28. Similarly, the temperature at the cylindrical surface of roller 26 should be such that the lenticules will have hardened into shape before exit from the chamber. The lenticulated sheet then passes from vacuum chamber 22 for further cooling within the ambient atmosphere before storage.

As can be seen more clearly in FIG. 2, two major factors producing poor registry between the groups of interdigitated picture elements of printed sheet 11 and the subsequently to be applied overlying lenticular sheet are a skew in the picture elements produced by stretch or shrinkage of the paper upon which the picture elements are printed as exhibited in exaggerated form by groups of picture elements 42, 43 and 44 and an inherent curvature of the picture elements produced by some printing processes as exhibited in exaggerated form by groups of picture elements 45, 46 and 47. The position of the respective groups of picture elements undistorted by skew and curvature are portrayed in dotted lines. In order to correct for skew, position indicators 15 are printed at opposite ends of selected picture elements in every third group of interdigitated picture elements. When stretch, shrinkage or uneven tension upon the sheet distorts the picture element to a non-perpendicular position relative to the edge of paper 11, a proportional distortion is produced in the alignment between opposite position indicators 15 of the same picture element.

The relative positioning of each of these indicators is obtained by reflecting light from aligned sources 31 and 32 along the opposite borders 16 of the moving sheet and measuring the time at which the light from sources 31 and 32 is absorbed or reflected by the contrastingly colored position indicators 15. Picture element curvature, however, is not detected by the relative location of position indicators 15 because only the center portion of the curved picture element is distorted with the position indicators situated on opposite ends of the picture element being in alignment. Thus detectors 33 and 34 are unable to observe the central curvature of picture element group 46 from an observation of the relative location of the position indicators. It has been found empirically however that the line curvature generally is of a fixed amount and consequently a fixed curvature correction in the form of a vertical parabolic signal can be utilized to vertically deflect the sweep of the electron beam thereby correcting for non-linearity.

The control circuit utilized both to initiate the traversal and to deflect the beam generated by electron gun 35 can be more readily seen by reference to FIGS. 3 and 4. The outputs of detectors 33 and 34 are fed to pulse shapers 50 and 51, respectively, to produce rectangular voltage output waveforms 52 and 53 of FIG. 4 having a phase relationship corresponding to the relative location of corresponding position indicator 15 situated along opposite borders of sheet 11 as measured by the detectors.

Because the location of position indicators 15 along the border observed by detector 33 is chosen to initiate and control the traversal of the electron beam generated by electron gun 36, the output voltage from pulse shaper 50 is applied as one input to phase comparison circuit 58 to produce an output voltage which is fed to oscillator 59. Upon receipt of each actuating signal from comparison circuit 58, oscillator 59 generates an output wavetrain having a predetermined number of pulses fixed equal to the number of groups of picture elements intermediate adjacent position indicators 15. The amplitude and the period between successive leading edges of the pulses generated by oscillator 59 is proportional to the amplitude of the output voltage from phase comparison circuit 58. In the preferred example described, wherein the position indicators are situated upon every third picture element, oscillator 59 generates three pulses per actuating signal. The output of oscillator 59 is fed as a triggering pulse to triangular waveform generator 60 to produce a triangular waveform 61 which energizes the horizontal sweep of electron gun 36. Each triangular wave of waveform 61 thus is initiated by the receipt of each triggering pulse from oscillator 59 with the period of the generated triangular wave, e.g. the time interval between initiation and termination of the triangular waveform, being determined by the amplitude of the triggering signal.

In order to accurately synchronize the initiation of waveform 61 with the advent of the picture elements under the electron beam, a portion of the output signal 61 is fed back through pulse forming circuit 62 and three-to-one frequency divider 63 to phase comparator 58 wherein a voltage output is generated having an amplitude proportional to the phase difference between the signal produced by detector 33 and triangular waveform 61. The proportional voltage then is applied to oscillator 59 to alter both the amplitude and period of the wavetrain employed to trigger generator 60.

The negligible delay produced by the circuitry components between the observation of a position indicator by detector 33 and the initiation of signals from triangular waveform generator 60 assures the registration of the end of the individual interdigitated picture element adjacent the border inspected by detector 33 with longitudinal slot 38 of electron gun 36 at the commencement of the electron beam scan across thermoplastic sheet overlying the interdigitated picture elements. Because correction of the horizontal sweep frequency is not expected to be required over distances less than about ten groups of picture elements, the location of position indicators 15 on every third group of picture elements is sufficient to assure good registration while avoiding a possible redundancy in the phase correctional signals produced by phase comparison circuit 58. The division factor of frequency divider 63 generally is determined by the picture element group spacing chosen between the position indicators. Because the spacing between the position indicators 15 observed by detector 33 did not vary, as indicated by waveform 52, the triangular waves forming waveform 61 are identical.

In correcting for the skew of the picture elements, each of the outputs of pulse shapers 50 and 51 are applied to a skew phase comparator circuit 56 to produce an output voltage 57 having an amplitude proportional to the phase difference between the signals produced by detectors 33 and 34, respectively. Thus the output 57 of skew phase compartor 56 is an analog of the displacement between position indicators 15 of the same interdigitated picture element and will vary from a positive voltage to a negative voltage dependent upon the relative location of the position indicators.

Output 61 of triangular waveform generator 60 and output 57 of skew phase comparator 56 are fed to modulator 64 wherein the triangular wave is amplitude modulated by an amount proportional to the phase difference between the output signals produced by detectors 33 and 34 as measured by skew phase comparator 56. Because the output 57 of skew phase comparator 56 can be either positive or negative, the output 65 of modulator 64 can be driven either positive or negative dependent upon the relative location of position indicators 15. Furthermore, when there is no skew in the printed picture elements as exhibited by an in-phase relationship between the generated signals of detectors 33 and 34, a zero voltage output is obtained from both skew phase comparator 56 and modulator 64.

An output 61 of triangular waveform generator 60 also is applied to an integration circuit 66 to produce the constant frequency parabolic waveshape 67 required for correction of the inherent curvature of the printing method. The outputs of integration circuit 66 and modulator 64 are summed in adder circuit 68 to produce a composite waveform 69 which is fed to a vertical deflection plate 39 of electron gun 36. Because the output 61 of triangular waveform generator 60 used to control the horizontal sweep of the electron gun also functions as an input for modulator 64 and integration circuit 66, a phase coincidence between the horizontal sweep and the output 69 of adder 68 utilized for vertical deflection is assured.

The photoelectric skew detection system of this invention also can be utilized for registering groups of interdigitated picture elements with a previously pressed lenticular sheet 70 by employment of the apparatus shown in FIG. 5. The skew of each lenticule of the pressed lenticular sheet is detected by passing light rays from aligned sources 31A and 32A through opposite ends of the same lenticule overlapping the cylindrical face or roller 26A and utilizing the inherent focusing of the lenticule to detect skew. Aligned detectors 33A and 34A are positioned adjacent the flat side of the pressed lenticular sheet at the focal point of the lenticules to produce a voltage output when the focused beams from light sources 31A and 32A, respectively, strike the detectors. The output of the detectors then is fed to an electron beam control circuit 35A, similar to control circuit 35 of FIG. 3, to produce dual output voltages which voltages are applied through leads 71 and 72 to the horizontal sweep and to deflection and focus plate 39 of electron gun 36A to control both the initiation and the vertical deflection, respectively, of the electron beam sweeping across the flat surface of the lenticular sheet to produce an electrostatic charge pattern corresponding point by point to the picture information to be printed.

The electrostatic writing of groups of interdigitated picture elements upon each lenticule of pressed sheet 70 generally is controlled by a picture information circuit 73. The picture information circuit preferably includes a master recording (not shown) of the groups of interdigitated picture elements, e.g. a magnetic tape bearing the picture information, which recording is transduced point by point to provide a varying electrical potential upon the grid of tube 36A proportional to variations in luminance along the length of the picture elements. Because the interdigitated picture elements forming the group often have a width as small as a half tone dot, a single scan controlled point by point in intensity by the master recording within picture information circuit 73 can suffice to produce an electrostatic line of charge on the thermoplastic sheet corresponding to a single interdigitated picture element. When the spacing between electron beam sweeps is set equal to the width of an interdigitated picture element, the number of electron beam sweeps across each lenticule to electrostatically write the picture information is equal to the number of interdigitated picture elements forming the group. The number of sweeps per lenticule required to write picture information however is not limited to the number of picture elements forming the group, and in actual practice a number of sweeps greater than the number of interdigitated picture elements forming the group often is used. The horizontal sweep output from electron beam control circuit 35A also is fed to picture information circuit 73 through lead 74 to synchronize the the initiation of the sweep of the picture elements of the master recording with the traversal of the electron beam across lenticular sheet 70.

Electron beam control circuit 35A generally is similar to the electron beam control circuit described in FIG. 3 with the exception that an output is generated by detectors 33 and 34 for each lenticule and a plurality of electron sweeps, e.g. ten, is required to properly produce a point by point electrostatic charge upon each lenticule corresponding to a group of interdigitated picture elements.

To effectuate ten sweeps per lenticule, oscillator 59 preferably will generate a wavetrain of ten pulses per actuating signal from phase controller 58 and frequency divider 63 will effectuate a ten-to-one division of the feedback voltage from triangular wave generator 60. A ten-to-one frequency multiplier (not shown) also is inserted between skew phase comparator 56 and modulator 64 to provide a skew phase modulating pulse for each horizontal sweep pulse of triangular generator 60. The operation of control circuit 35A in all other respects is identical with that previously described with reference to FIG. 3. Although the three dimensional picture writing system of FIG. 5 generally produces a high degree of registration between the groups of picture elements and the overlying lenticules because the skew of each lenticule is measured, the possibility of error caused by the detection of the focal point of an adjacent lenticule or by redundancy in the generated outputs of phase comparison circuits 56 and 58 is greatly enhanced.

Thus in the printing of a three dimensional picture, picture information is transduced from the master recording situated within picture information circuit 73 and is fed by lead 75 to the grid of electron tube 36A to control the intensity of the electron beam scanning thermoplastic sheet 70. The scan of the beam across the flat surface of the thermoplastic sheet is regulated by electron beam control circuit 35A which controls both the initiation of the horizontal sweep and the magnitude of the electron beam deflection produced by deflection and focus plates 39. Electron beam control circuit 35A also supervises the readout of picture information circuit 73 to synchronize the initiation of the sweep of electron gun 36A with the initiation of a readout cycle from the master recording within picture information circuit 73. The surface of the thermoplastic thus is charged with an electrostatic charge pattern corresponding point by point to the picture information to be printed. Because the thermoplastic is not hot during the electron beam scan, the electrostatic charge does not interact with the lenticular sheet to distort the lens formation. The charged sheet then exits closed chamber 25A through bottom opening 24A and is fed to a dusting chamber 76 wherein the charged plastic surface is covered with a toner which is subsequently fused to produce groups of interdigitated picture elements in registry with the pressed lenticular sheet.

Although the detection system portrayed in FIG. 5 is utilized to control the direct application of an electrostatic charge to a pressed lenticular sheet, the detection system of this invention also can be employed in methods wherein an intermediate device is utilized as a transfer medium for the electrostatic charge. Similarly the number of electron beam sweeps required to print each group of interdigitated picture elements can vary dependent upon the width and number of interdigitated picture elements forming each group.

While several examples of this invention have been shown and described it will be apparent to those skilled in the art that many changes and modifications may be made without departing from this invention in its broader aspects and therefore the appended claims are intended to cover all such changes and modifications as fall within the true spirit and scope of this invention.

What I claim as new and desire to secure by Letters Patent of the United States is:

1. The method of producing three dimensional pictures of the type having a thermoplastic lenticular screen overlying and registered with groups of interdigitated picture elements which comprises scanning an electron beam across a thermoplastic sheet to establish spaced lines of charge on said thermoplastic sheet, controlling the electron beam in accordance with the position of a completed component portion of said three dimensional picture to register the lines of charge with the side edges of said completed component portion of said three dimensional picture and developing said selectively charged thermoplastic sheet to form a composite picture characterized by groups of interdigitated picture elements each registered with an overlying lenticule of said lenticular screen, said composite picture exhibiting a three dimensional effect when viewed through said lenticular screen.

2. A method of printing three dimensional pictures according to claim 1 wherein the completed component portion of said three dimensional picture is a pressed lenticular sheet, said electron beam is traversed over the flat surface of said lenticular sheet to produce a charge pattern in registry with the lenticules of said pressed lenticular sheet, said charge pattern corresponding point by point to the interdigitated picture information, and said developing is accomplished by dusting said charged surface with a toner.

3. The method of producing three dimensional pictures of the type having a thermoplastic lenticular screen overlying and registered with groups of interdigitated picture elements which comprises heating a thermoplastic sheet to a temperature permitting electron beam deformation of said sheet, scanning an electron beam across said thermoplastic sheet in the direction of said picture elements and at intervals equal to the width of a group of the picture elements to establish spaced lines of charge on said thermoplastic sheet, and controlling the electron beam in accordance with the position of a group of interdigitated picture elements to register the lines of charge with the side edges of said group of interdigitated picture elements.

4. The method of claim 3 in which position markers are provided in predetermined relationship to the groups of picture elements and the electron beam is controlled in response to the location of the position markers.

5. The method of claim 3 in which the position of predetermined picture elements is detected at both ends thereof and the electron beam is controlled with respect to the detected position of said predetermined picture elements to take account of skew of the picture elements in the scanning of the electron beam.

6. A method of printing three dimensional pictures according to claim 3 including additionally deflecting said beam by a vertical parabolic signal to compensate for line curvature.

7. An apparatus for printing three dimensional pictures of the type having a thermoplastic lenticular screen overlying and registered with groups of interdigitated picture elements comprising a thermoplastic sheet, means for scanning an electron beam across said thermoplastic sheet to establish spaced lines of charge on said thermoplastic sheet, means for controlling the electron beam in accordance with the position of a completed component portion of said three dimensional picture to register the lines of charge with the side edges of said completed component portion of said three dimensional picture and means for developing said selectively charged thermoplastic sheet to form a composite picture characterized by groups of interdigitated picture elements each registered with an overlying lenticule of said lenticular screen, said composite picture exhibiting a three dimensional effect when viewed through said lenticular screen.

8. An apparatus according to claim 7 wherein said completed component portion of said three dimensional picture is a group of picture elements and said electron beam is scanned in the direction of the length of the picture elements and at intervals equal to the width of a group of the picture elements, said apparatus further including means for heating said thermoplastic sheet to a temperature permitting electron beam deformation of said sheet prior to scanning said electron beam across said sheet.

9. An apparatus according to claim 8 including a vacuum chamber wherein said thermoplastic sheet is deformed into a lenticular screen in registry with said group of picture elements, said vacuum chamber having an aperture to permit passage of said thermoplastic sheet there-through and at least one pumped section situated proximate said aperture to exhaust air tending to flow into said vacuum chamber.

10. An apparatus for printing three dimensional pictures comprising means for printing groups of interdigitated picture elements upon an elongated sheet means for printing position markers along at least one end of selected picture elements simultaneously with the printing of said element, means for coating said printed sheet with a thermoplastic layer heated to a temperature permitting electron beam deformation of said thermoplastic layer, means for detecting said position markers, means for traversing an electron beam across said thermoplastic layer and means for initiating the traversal of said electron beam in accordance with the detected location of said position markers.

11. An apparatus according to claim 10 including the printing of position markers along both ends of selected picture elements simultaneously with the printing of said element, means for detecting the skew of said position markers and means for deflecting said electron beam along its traversal path by an amount proportional to the detected skew of said position markers.

12. A method of printing three dimensional pictures according to claim 1 wherein the completed component portion of said three dimensional picture is a group of interdigitated picture elements and said developing of said thermoplastic sheet is accomplished by interaction of said spaced lines of charge with said thermoplastic sheet to produce controlled deformation of said thermoplastic sheet into a lenticular lens.

References Cited

UNITED STATES PATENTS

| | | | |
|---|---|---|---|
| 3,144,637 | 8/1964 | Adams et al. | 346—108 |
| 3,317,713 | 5/1967 | Wallace. | |
| 3,427,628 | 2/1969 | Clunis. | |
| 2,562,077 | 7/1951 | Winnek. | |
| 3,241,429 | 3/1966 | Rice et al. | 117—10 |

RICHARD MURRAY, Primary Examiner

D. E. STOUT, Assistant Examiner

U.S. Cl. X.R.

178—6.5